US011117648B2

(12) United States Patent
Hencke et al.

(10) Patent No.: US 11,117,648 B2
(45) Date of Patent: Sep. 14, 2021

(54) LINKAGE MECHANISM FOR LINKING A FLAPERON TO A DROOP PANEL OF AN AIRCRAFT

(71) Applicant: Airbus Operations GmbH, Hamburg (DE)

(72) Inventors: Marc Hencke, Hamburg (DE); Markus Gibbert, Hamburg (DE); Florian Gehle, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 318 days.

(21) Appl. No.: 16/256,814

(22) Filed: Jan. 24, 2019

(65) Prior Publication Data

US 2019/0241250 A1 Aug. 8, 2019

(30) Foreign Application Priority Data

Feb. 7, 2018 (DE) .......................... 102018102741.9

(51) Int. Cl.
*B64C 9/02* (2006.01)
*B64C 9/18* (2006.01)
(Continued)

(52) U.S. Cl.
CPC .................. *B64C 9/18* (2013.01); *B64C 9/02* (2013.01); *B64C 9/04* (2013.01); *B64C 9/16* (2013.01);
(Continued)

(58) Field of Classification Search
CPC .... B64C 9/02; B64C 9/04; B64C 9/18; B64C 9/20; B64C 13/28; B64C 13/30
See application file for complete search history.

(56) References Cited

U.S. PATENT DOCUMENTS

| 4,181,275 A * | 1/1980 | Moelter ................... B64C 9/16 |
| | | 244/213 |
| 2007/0176051 A1* | 8/2007 | Good ....................... B64C 9/32 |
| | | 244/215 |

(Continued)

FOREIGN PATENT DOCUMENTS

| EP | 2669189 A1 | 12/2013 |
| EP | 2738087 A2 | 6/2014 |

(Continued)

OTHER PUBLICATIONS

European Office Action for European Application No. 19153887.5, five pages, dated Feb. 23, 2021.

*Primary Examiner* — Philip J Bonzell
*Assistant Examiner* — Tye William Abell
(74) *Attorney, Agent, or Firm* — Nixon & Vanderhye P.C.

(57) ABSTRACT

A linkage mechanism for a flaperon includes a support structure linkage, a droop panel linkage, and a flaperon linkage. The support structure linkage is pivotally attached to a support structure of a wing of an aircraft. The droop panel linkage is pivotally attached a droop panel. The flaperon linkage is pivotally attached to a flaperon. A second end of the droop panel linkage and a second end of the flaperon linkage are pivotally attached to a connecting section of the support structure linkage. The connecting section is spaced apart from the pivot end of the support structure linkage such that the linkage mechanism transfers a pivoting motion from the flaperon into a pivoting motion of the droop panel.

8 Claims, 4 Drawing Sheets

(51) Int. Cl.
*B64C 13/30* (2006.01)
*B64C 9/04* (2006.01)
*B64C 9/16* (2006.01)
*B64C 9/00* (2006.01)

(52) U.S. Cl.
CPC ........ B64C 13/30 (2013.01); *B64C 2009/005* (2013.01)

(56) References Cited

U.S. PATENT DOCUMENTS

| | | | | |
|---|---|---|---|---|
| 2013/0112814 A1* | 5/2013 | Yue | ............................ | B64C 9/32 244/215 |
| 2013/0320151 A1* | 12/2013 | Kordel | ...................... | B64C 9/16 244/215 |
| 2014/0145039 A1* | 5/2014 | Beyer | ........................ | B64C 9/16 244/215 |
| 2016/0176508 A1* | 6/2016 | Fevergeon | ................. | B64C 9/04 244/217 |
| 2016/0251074 A1* | 9/2016 | Tsai | ........................... | B64C 9/16 244/215 |

FOREIGN PATENT DOCUMENTS

| | | |
|---|---|---|
| EP | 3034392 A1 | 6/2016 |
| FR | 2116264 A1 | 7/1972 |

\* cited by examiner

LINKAGE MECHANISM FOR LINKING A FLAPERON TO A DROOP PANEL OF AN AIRCRAFT

CROSS-REFERENCE TO PRIORITY APPLICATION

This application claims the benefit of, and priority to, German patent application number DE 102018102741.9, filed Feb. 7, 2018. The content of the referenced application is incorporated by reference herein.

TECHNICAL FIELD

Embodiments of the subject matter described herein relate generally to a linkage mechanism for linking a flaperon to a droop panel of an aircraft, a wing of an aircraft, and an aircraft.

BACKGROUND

Flaperons are flight controlling devices at a wing of an aircraft having the combined function of a flap and an aileron. Like ailerons and flaps, flaperons may be mounted on a wing with or without a droop panel. If the flaperon is mounted with a droop panel, the droop panel may adjust the gap which opens between the wing structure and the flaperon when a flaperon is pivoted. Due to the adjustment, the gap may be maintained at a desired level.

To ensure and guide the motion of the droop panel when the flaperon is pivoted, it is known to use a linkage between the flaperon and the panel which slides along a track in the wing structure. The main disadvantages of this mechanism are that the track may jam and that the manufacturing effort is high.

US 2013/0112814 A1 describes a droop panel linkage including a lever arm, a main lever, a main tube and at least one drive strut. A first end of the lever arm is pivotally attached to a flap and a second end is pivotally connected to a first end of the main lever. A second end of the main lever is provided with a first engagement element for engaging with a second engagement element incorporated into or associated with the main tube. The main tube is pivotally connected to a proximal end of the drive strut. A distal end of the drive strut is pivotally attached to the droop panel. However, a flaperon needs a higher flexibility than a flap.

Thus, there is the need for providing an improved linkage mechanism for linking the flaperon and the droop panel.

BRIEF SUMMARY

Various objectives are met by the features of the independent claims. Advantageous embodiments are subject matter of the dependent claims and the following description.

According to the disclosure, a linkage mechanism for linking a flaperon to a droop panel of an aircraft is provided. The linkage mechanism comprises a support structure linkage, a droop panel linkage, and a flaperon linkage, wherein the support structure linkage is pivotally attached at a pivot end to a support structure of a wing of an aircraft, wherein the droop panel linkage is pivotally attached at a first end to a droop panel, wherein the flaperon linkage is pivotally attached at a first end to a flaperon, and wherein a second end of the droop panel linkage and a second end of the flaperon linkage are pivotally attached to a connecting section of the support structure linkage, wherein the connecting section is spaced apart from the pivot end of the support structure linkage, such that the linkage mechanism is configured to transfer a pivoting motion from the flaperon into a pivoting motion of the droop panel.

The linkage mechanism according to the disclosure provides just linkages for connecting the flaperon to the droop panel. Thus, the flaperon linkage and the droop panel linkage are pivotally linked and provide a direct linkage connection between the flaperon and the droop panel. At the linking point between the flaperon linkage and the droop panel linkage, both linkages are pivotally connected to the support structure linkage. Due to the connection of the support structure linkage to the support structure of the wing, furthermore, both linkages are connected to the support structure of the wing. The support structure therefore provides a static support location for the linkage mechanism which may serve as reference point for the motion of the linkage mechanism. Therefore, the actuation of the droop panel by the motion of the flaperon may be adjusted by choosing the length of the linkages and the attachment position of the support structure linkage at the support structure. Since all connections between the linkages of the linkage mechanism are pivoting connections, jam failure cases are prevented. Furthermore, since the linkage mechanism is trackless the manufacturing and installation of a track is avoided which reduces the manufacturing effort and cost. Additionally, rigging can be implemented with the linkage mechanism inside each linkage.

In an example, the droop panel and the flaperon each comprise a lever arm, wherein the first end of the droop panel linkage and the first end of the flaperon linkage are pivotally attached to the lever arm of the droop panel and the lever arm of the flaperon, respectively. The lever arms on the flaperon and the droop panel increase the adjustability of the motion of the droop panel in response to the motion of the flaperon.

According to an example, the connecting section is configured to pivot around the pivot end of the support structure linkage. This means that the bearing of the pivot end on the support structure is static and that the connecting section of the support structure linkage may perform a motion along a curvature. This simplifies the installation effort and the function of the linkage mechanism.

According to an example, the pivot end of the support structure linkage is pivotally attached to a lever arm of the support structure. This further increases the adjustability of the relative motion of the droop panel that is induced by the motion of the flaperon.

According to an example, the connecting section of the support structure linkage is arranged below the pivot end of the support structure linkage. The support structure linkage then performs a pivotal motion around the connection between the pivot end and the support structure. Furthermore, the connection point between the pivot end and the support structure may be located close to the droop panel such that the motion range of the droop panel may be increased.

According to another example, the connecting section of the support structure linkage is arranged above the pivot end of the support structure linkage. In this exemplary embodiment, the pivot end of the support structure linkage may be connected close to the support structure. This may reduce the forces on the connection between the support structure linkage and the support structure.

According to an example, the connecting section comprises at least two lever arms, wherein the second end of the flaperon linkage is pivotally attached to a first lever arm of the at least two lever arms and the second end of the droop panel linkage is pivotally attached to a second lever arm of the at least two lever arms. Due to the two lever arms, the connecting section may transfer the motion of the flaperon to the panel with a high motion range for the droop panel and the flaperon. Furthermore, the arrangement and the shape of the two lever arms with respect to each other may provide an adjustment means for adjusting the relative motion velocity between the droop panel and the flaperon and their motion ranges.

According to an example, the at least two lever arms of the connecting section are arranged in an L-shape, wherein the first lever arm of the at least two lever arms points to the droop panel and the second lever arm of the at least two lever arms points to the flaperon.

In an example, a pivot motion of the support structure linkage, a pivot motion of the droop panel linkage, and a pivot motion of the flaperon linkage each define a separate surface which may be a movement plane. The motion of the linkages in their own surfaces will avoid clashes of the linkages during the motion of the flaperon. In a preferable exemplary embodiment, the surfaces may be non-parallel, and/or curved, wherein the surfaces comprise a common cross line, wherein the linkages are spaced apart from that cross line. In another exemplary embodiment, each surface is parallel to the further surfaces. The parallel arrangement of the surfaces will prevent clashes between the linkages. Both exemplary embodiments may improve the prevention of clashes between the linkages.

In an example, the linkage mechanism is configured to allow a pivot motion of the flaperon for an angle within the range from 30° up to 70° down, preferably within the range from 20° up to 50° down, from a normal position of the flaperon. The normal position of the flaperon is determined by a lack of air deflection from a wing by the flaperon. In the normal position a chord line of the flaperon is defined to be in a 0° position, the chord line connecting a leading edge of the flaperon to a trailing edge of the flaperon. A pivot motion of the flaperon of for example 10° up means that the flaperon is moved such that the chord line of the flaperon deviates by 10° upward from the normal position. The motion of the flaperon of for example 30° down means that the flaperon is moved such that the chord line of the flaperon deviates by 30° downward from the normal position.

According to the disclosure, also a wing of an aircraft is provided, the wing comprising a droop panel, a flaperon, a support structure, and a linkage mechanism according to the above description, wherein the droop panel is pivotally attached at a connection point to the wing, wherein the flaperon is pivotally attached at a connection point to the wing, wherein the support structure is rigidly attached to the wing, wherein the first end of the droop panel linkage is pivotally attached to the droop panel and is spaced apart from the connection point of the droop panel, and wherein the first end of the flaperon linkage is pivotally attached to the flaperon and is spaced apart from the connection point of the flaperon.

According to an example, a deflection range of the flaperon is within the range from 30° up to 70° down, preferably within the range from 20° up to 50° down, from a normal position of the flaperon in which no deflection occurs.

The effects and further embodiments of the wing of an aircraft according to the present disclosure are analogous to the effects and embodiments of the linkage mechanism. Thus, it is referred to the above description of the linkage mechanism.

According to the disclosure, also an aircraft is provided, the aircraft comprising a linkage mechanism according to the above description or a wing according to the above description.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following, an exemplary embodiment of the invention is described with reference to the attached drawing.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
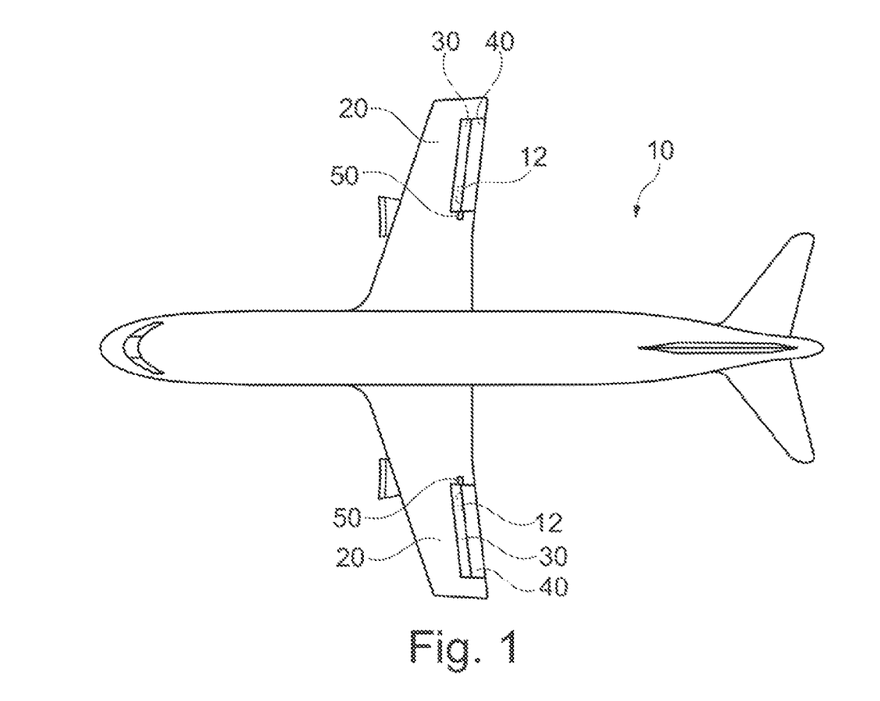
FIG. 1 shows a schematic drawing of an aircraft with the linkage mechanism.

FIG. 1 shows an aircraft 10 comprising at least one wing 20. The wing comprises a droop panel 30 and the flaperon 40.

The droop panel 30 is pivotally connected to the wing 20 at a connection point 38. Furthermore, the flaperon 40 is pivotally connected to the wing 20 at a connection point 48. The flaperon 40 may be connected to the support structure 60, wherein the support structure 60 may be rigidly connected to the wing 20. A pivoting device 50 may pivot the flaperon 40 around the pivotal connection to the wing 20 such that the flaperon 40 pivots around a hinge line.

The droop panel 30 and the flaperon 40 are connected by a linkage mechanism 12. The linkage mechanism 12 transfers the motion of the flaperon 40 to the droop panel 30. Thus, due to the linkage mechanism 12, the droop panel 30 automatically adjusts the gap which opens when the flaperon 40 pivots around the connection point 48 to the wing 20.

Figure 2A:
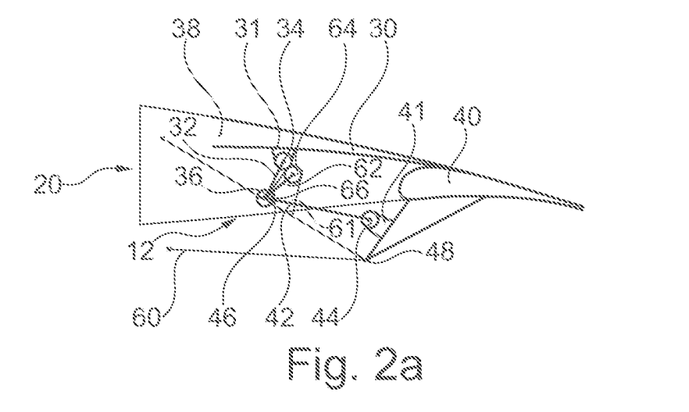
FIG. 2a-c show schematic drawings of the linkage mechanism in exemplary embodiments.
Figure 2B:
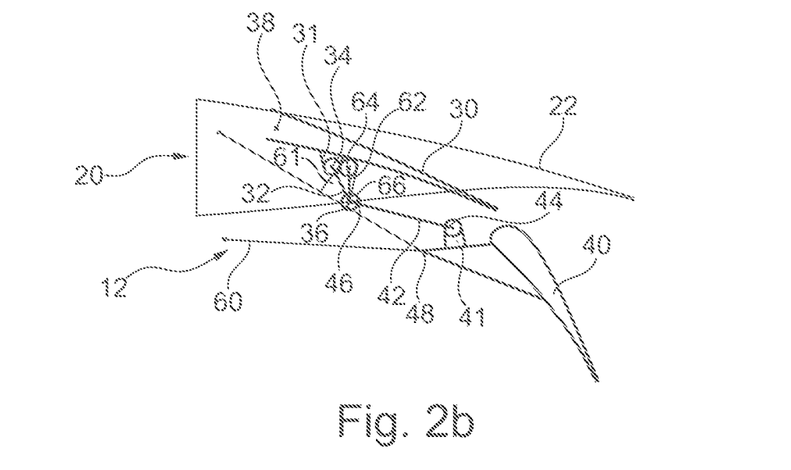
Figure 2C:
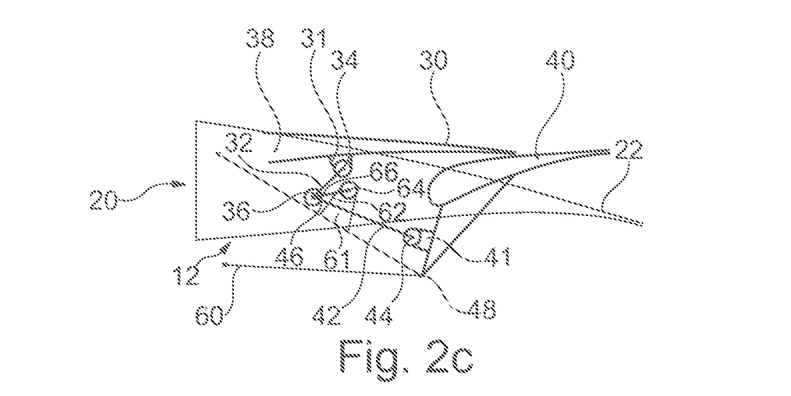

The linkage mechanism 12 is shown in FIGS. 2A to 2C. The linkage mechanism 12 comprises a droop panel linkage 32, a support structure linkage 62, and a flaperon linkage 42.

The droop panel linkage 32 comprises a first end 34 and a second end 36. The first end 34 and the second end 36 form opposite ends of the droop panel linkage 32, i.e. the first end 34 of the droop panel linkage 32 is opposite to the second end 36 of the droop panel linkage 32. The first end 34 is pivotally connected to the droop panel 30. This means, that the droop panel linkage 32 may pivot around the connection to the droop panel 30.

The pivotal connection to the droop panel 30 of the first end 34 is spaced apart from the connection point 38. Thus, the droop panel linkage 32 may provide a momentum to the droop panel 30 such that the droop panel 30 pivots around the connection point 38.

The droop panel 30 further comprises a lever arm 31 for connecting to the first end 34 of the droop panel linkage 32. Thus, the first end 34 of the droop panel linkage 32 does not directly connect to the droop panel 30 but spaced apart from the droop panel 30 by the lever arm 31.

The flaperon linkage 42 comprises a first end 44 and a second end 46. The first end 44 of the flaperon linkage 42 is opposite to the second end 46 of the flaperon linkage 42. The first end 44 is pivotally connected to the flaperon 40, i.e. the flaperon linkage 42 may pivot around the pivotal connection of the first end 44.

The connection of the first end 44 to the flaperon 40 is spaced apart from the connection point 48 of the flaperon 40 to the wing 20. This means a pivotal motion of the flaperon 40 around the connection point 48 will result in a momentum on the flaperon linkage 42.

The flaperon 40 further comprises a lever arm 41 for connecting to the first end 44 of the flaperon linkage 42. Thus, the first end 44 of the flaperon linkage 42 does not directly connect to the flaperon 40 but is spaced apart from the flaperon 40 by the lever arm 41.

The support structure linkage 62 comprises a pivot end 64 and a connecting section 66. The pivot end 64 of the support structure linkage 62 is opposite to the connecting section 66 of the support structure linkage 62. The pivot end 62 is pivotally connected to the support structure 60.

The support structure 60 comprises a bearing arm 61 which provides the connection to the pivot end 64 of the support structure linkage 62. Bearing arm 61 spaces apart the pivot end 64 of the support structure linkage 62 from the support structure 60. Since the pivot end 64 is spaced apart from the support structure 60, the connecting section 66 of the support structure linkage 62 may be arranged below the pivot end 64 of the support structure linkage 62.

The second end 36 of the droop panel linkage 32 and the second end 46 of the flaperon linkage 42 are pivotally connected to the connecting section 66 of the support structure linkage 62. This means, that the linkage mechanism 12 connects the droop panel 30 and the flaperon 40 to the support structure 60. Since the support structure 60 is rigidly connected to the wing 20, a momentum being applied by the pivotal motion of the flaperon 40 on the linkage mechanism 12 will not result in a motion of the support structure 60. The support structure linkage 62 rather forces the second end 36 of the droop panel linkage 32 and the second end 46 of the flaperon linkage 42 on a predetermined trajectory around the pivot end 64 of the support structure linkage 62.

In an exemplary embodiment, the second end 36 of the droop panel linkage 32 may be pivotally connected to the second end 46 of the flaperon linkage 42. Thus, the droop panel linkage 32 and the flaperon linkage 42 directly link the flaperon 40 to the droop panel 30. In this example, the end section 66 of the support structure linkage 62 may be formed by a single end of the support structure linkage 62.

In an example, the flaperon linkage 42 and the droop panel linkage 32 may be connected to the support structure linkage 62 at a common connection point. In another example, the flaperon linkage 42 and the droop panel linkage 32 may be connected to the support structure linkage 62 at separate connection points, the connection points being spaced apart from each other.

FIG. 2A shows the flaperon 40 in the normal position. In this position, the flaperon 40 does not deflect the airflow which flows along and around the wing 20. Thus, the flaperon 40 does not provide any momentum for controlling the aircraft 10 nor any braking force for decelerating the aircraft 10.

FIGS. 2B and 2C show the flaperon 40 in a pivoted position. Further shown is a static portion 22 of the wing 20 which is laterally arranged to the flaperon 40. That static portion 22 also marks the normal position of the flaperon 40 with respect to the wing 20.

In FIG. 2B, the flaperon 40 is pivoted downwards, such that the flaperon 40 deflects the airstream flowing below the wing 20 downwards. Furthermore, the flaperon 40 has an angle of 50° with respect to the normal position.

The motion of the flaperon 40 turns the support structure linkage 62 around the pivot end 64 and further provides a pulling force on the droop panel linkage 32 which pulls down the droop panel 30. Thus, due to the linkage mechanism 12, the droop panel 30 is also pivoted downwards and closes the gap which results from the downward motion of the flaperon 40.

In FIG. 2C, the flaperon 40 is pivoted upwards, such that the flaperon 40 deflects the airstream flowing above the wing 20 upwards. Furthermore, the flaperon 40 has an angle of 20° with respect to the normal position.

The motion of the flaperon 40 turns the support structure linkage 62 around the pivot end 64 and provides a pushing force on the droop panel linkage 32 which pushes up the droop panel 30. Thus, due to the linkage mechanism 12, the droop panel 30 is pivoted upwards to increase the range of the upward motion of the flaperon 40.

Figure 3:
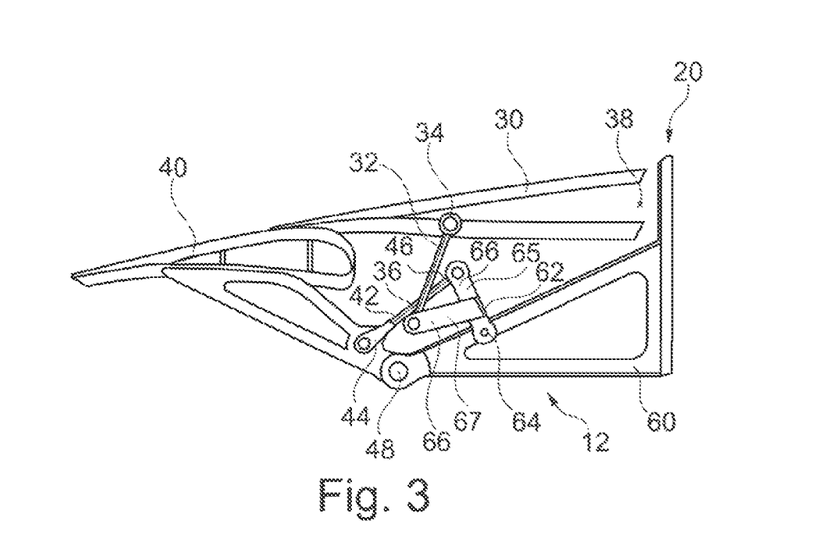
FIG. 3 shows a schematic drawing of the linkage mechanism in another exemplary embodiment.

FIG. 3 shows a further exemplary embodiment of the linkage mechanism 12. The main difference between the embodiment of FIG. 3 to the embodiment of FIGS. 2A to C is the connection of the pivot end 64 of the support structure linkage 62 to the support structure 60. In FIG. 3, the pivot end 64 is directly attached to the support structure 60. Thus, the support structure 60 does not comprise a bearing arm 61.

The connecting section 66 of the support structure linkage 62 is therefore arranged above the pivot end 64 of the support structure linkage 62. Thus, when the connecting section 66 is pivoted around the pivot end 64, the connecting section 66 travels on a curvature around the pivot end 64, wherein the curvature is located above the pivot end 64.

The support structure linkage 62 comprises a connecting section 66 which comprises a first lever arm 65 and a second lever arm 67. The first lever arm 65 is pivotally connected to the second end 46 of the flaperon linkage 42. The second lever arm 67 is pivotally connected to the second end 36 of the droop panel linkage 32.

In the embodiment shown in FIG. 3, the lever arms 65 and 67 form an L-shape, wherein the first lever arm 65 points to the droop panel 30 and the second lever arm 67 points to the flaperon 40. However, the lever arms 65 and 67 may be arranged in any shape, e.g. V-shaped or T-shape.

The further difference to the embodiment being shown in FIGS. 2A to C is that the first end 34 of the droop panel linkage 32 is directly attached to the droop panel 30. The lever arm 31 is omitted in the embodiment of FIG. 3 with respect to the embodiment of FIGS. 2A to C. Furthermore, the first end 44 of the flaperon linkage 42 is directly connected to the flaperon 40. Here, the lever arm 41 is omitted in the embodiment of FIG. 3 with respect to the embodiment of FIGS. 2A to C.

In the embodiment of FIG. 3, a pivotal motion of the flaperon 40 around the connection point 48 connecting the flaperon 40 to the support structure 60 of the wing 20 is transferred via the flaperon linkage 42 to the first lever arm 65 of the connecting section 66. This causes the support structure linkage 62 to pivot around the pivot end 64. This pivot motion of the support structure linkage 62 results in a pivot motion of the second lever arm 67 of the connecting section 66. The pivot motion of the second lever arm 67 is transferred via the droop panel linkage 32 to the droop panel 30 such that the droop panel 30 is pivoted around the connection point 38 connecting the droop panel 30 to the wing 20.

FIGS. 4A to 4F show schematic views of different exemplary embodiments of the arrangement of the linkages 32, 42, 62 with respect to each other. The droop panel linkage 32 is arranged such that it pivotally moves inside a surface 33. The flaperon linkage 42 is arranged such that it pivotally moves inside a surface 43. The support structure linkage 62 is arranged such that it pivotally moves inside a surface 63. The surfaces 33, 43, 63 may be curved and/or twisted surfaces if the hinge lines of the flaperon 40 and the droop panel 30 are non-parallel.

Figure 4A:
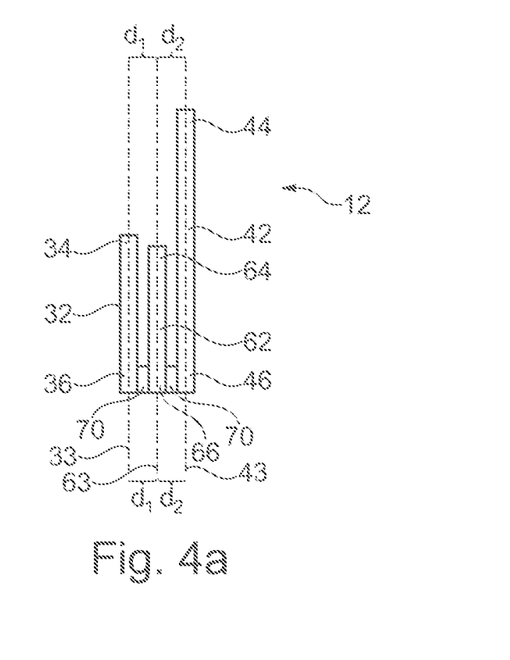
FIG. 4a-f show schematic drawings of the linkage mechanism with different surfaces of motion for the linkages.

In FIG. 4A, the surfaces 33, 43, 63 are parallel to each other. This means that the surface 33 of the droop panel linkage 32 is spaced apart by a distance d1 from the surface 63 of the support structure linkage 62. Furthermore, the surface 63 of the support structure linkage 62 is spaced apart by a distance d2 from the surface 43 of the flaperon 40.

Furthermore, in this embodiment, distance elements 70 are arranged between the second end 36 of the droop panel linkage 32 and the connecting section 66 of the support structure linkage 62, and between the second end 46 of the flaperon linkage 42 and the connecting section 66 of the support structure linkage 62. The distance elements 70 shall avoid friction or clashing between linkages during a pivotal motion.

Figure 4B:
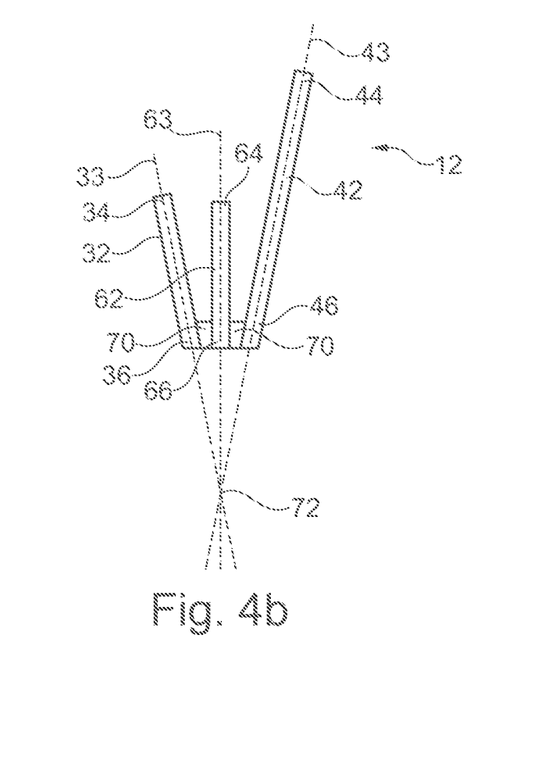
Figure 4C:
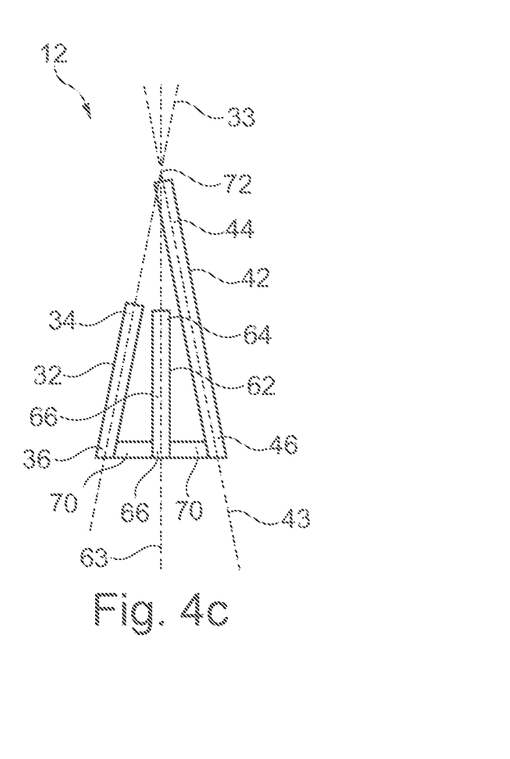
Figure 4D:
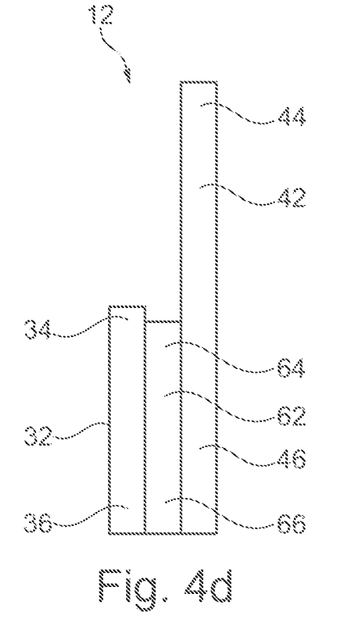

FIGS. 4B and 4C show further embodiments, in which the surfaces 33, 43, and 63 are crossing each other. In FIG. 4B the crossline 72 of the surfaces 33, 43 and 63 is a common crossline in which all surfaces 33, 43 and 63 cross each other. However, in another embodiment, there may be three cross lines each marking a cross line of a pair of the three surfaces. In further embodiments two surfaces may be parallel and one surface may be angled to those two surfaces.

According to FIG. 4B, the surfaces 33, 43, 63 are angled such that the first ends 34 and 44 of the droop panel linkage 32 and the flaperon linkage 42, respectively, and the pivot end 64 of the support structure linkage 62 point away from the crossline 72.

In another embodiment being shown in FIG. 4C, the surfaces 33, 43, and 63 are angled such that the first ends 34 and 44 of the droop panel linkage 32 and the flaperon linkage 42, respectively, and the pivot end 64 of the support structure linkage 62 point towards the crossline 72. In the embodiment being shown in FIG. 4D, the linkages are arranged parallel to each other but omitting the distance elements 70.

Figure 4E:
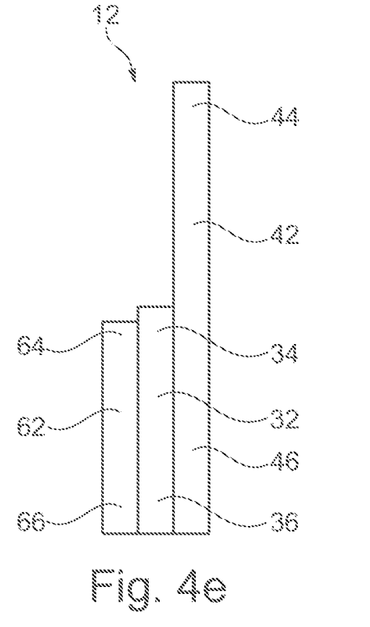
Figure 4F:
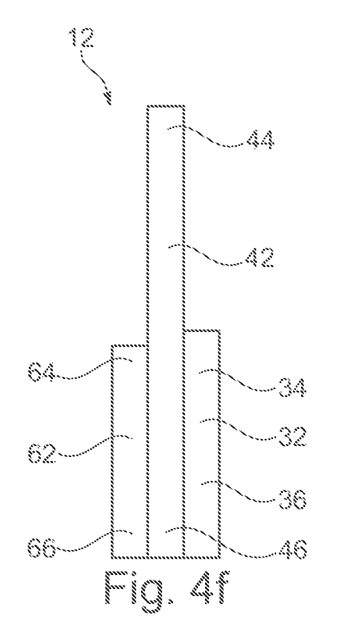

Although in the embodiments shown in FIGS. 4A to 4D, the support structure linkage 62 is arranged in a sandwich position between the droop panel linkage 32 and the flaperon linkage 42, also the droop panel linkage 32 or the flaperon linkage 42 may be arranged between the further linkages. Such embodiments are shown in FIGS. 4E and 4F.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft wing comprising a droop panel, a flaperon, a support structure, and a linkage mechanism for linking the flaperon to the droop panel, the linkage mechanism comprising:
   a support structure linkage;
   a droop panel linkage; and
   a flaperon linkage;
   wherein the support structure linkage is pivotally attached at a pivot end to a support structure of the wing;
   wherein the droop panel linkage is pivotally attached at a first end to the droop panel;
   wherein the flaperon linkage is pivotally attached at a first end to the flaperon;
   wherein a second end of the droop panel linkage and a second end of the flaperon linkage are pivotally attached to a connecting section of the support structure linkage, wherein the connecting section is spaced apart from the pivot end of the support structure linkage, such that the linkage mechanism is configured to transfer a pivoting motion from the flaperon into a pivoting motion of the droop panel;
   wherein the connecting section of the support structure linkage is arranged below the pivot end of the support structure linkage;
   wherein the droop panel linkage and the flaperon linkage directly link the flaperon to the droop panel;
   wherein the connecting section comprises at least two lever arms, wherein the second end of the flaperon linkage is directly pivotally attached to a first lever arm of the at least two lever arms, and the second end of the droop panel linkage is directly pivotally attached to a second lever arm of the at least two lever arms.

2. The wing according to claim 1, wherein the connecting section is configured to pivot around the pivot end of the support structure linkage.

3. The wing according to claim 1, wherein the pivot end of the support structure linkage is pivotally attached to a bearing arm of the support structure.

4. The wing according to claim 1, wherein the connecting section of the support structure linkage is arranged above the pivot end of the support structure linkage.

5. The wing according to claim 1, wherein the at least two lever arms of the connecting section are arranged in an L-shape, and wherein the first lever arm of the at least two lever arms points to the droop panel and the second lever arm of the at least two lever arms points to the flaperon.

6. The wing according to claim 1,
   wherein the droop panel is pivotally attached at a connection point to the wing;
   wherein the flaperon is pivotally attached at a connection point to the wing;
   wherein the support structure is rigidly attached to the wing;
   wherein the first end of the droop panel linkage is pivotally attached to the droop panel and is spaced apart from the connection point of the droop panel; and wherein the first end of the flaperon linkage is pivotally attached to the flaperon and is spaced apart from the connection point of the flaperon.

7. The wing according to claim 6, wherein a deflection range of the flaperon is within the range from 30° up to 70° down, from a normal position of the flaperon in which no deflection of air occurs.

8. An aircraft comprising a wing configured in accordance with claim 1.

\* \* \* \* \*